US009830832B2

(12) United States Patent
Warren et al.

(10) Patent No.: US 9,830,832 B2
(45) Date of Patent: Nov. 28, 2017

(54) AUTOMATED SYSTEMS, METHODS, AND APPARATUS FOR BREATH TRAINING

(71) Applicant: Halare, Inc., Warriors Mark, PA (US)

(72) Inventors: Anthony C. Warren, Warriors Mark, PA (US); Jack Kaplan, Princeton, NJ (US)

(73) Assignee: HALARE, INC., Warriors Mark, PA (US)

( * ) Notice: Subject to any disclaimer, the term of this patent is extended or adjusted under 35 U.S.C. 154(b) by 208 days.

(21) Appl. No.: 14/045,351

(22) Filed: Oct. 3, 2013

(65) Prior Publication Data

US 2014/0178844 A1 Jun. 26, 2014

Related U.S. Application Data

(60) Provisional application No. 61/740,092, filed on Dec. 20, 2012, provisional application No. 61/825,973, filed on May 21, 2013.

(51) Int. Cl.
*G09B 19/00* (2006.01)

(52) U.S. Cl.
CPC ................... *G09B 19/003* (2013.01)

(58) Field of Classification Search
CPC .................................................. G09B 19/00
USPC .......................................................... 434/247
See application file for complete search history.

(56) References Cited

U.S. PATENT DOCUMENTS

| | | | | |
|---|---|---|---|---|
| 3,991,304 A | * | 11/1976 | Hillsman | 600/538 |
| 5,694,939 A | * | 12/1997 | Cowings | 600/484 |
| 5,725,472 A | * | 3/1998 | Weathers | 600/21 |
| 5,997,482 A | * | 12/1999 | Vaschillo | A63B 71/0686 600/484 |
| 6,026,322 A | * | 2/2000 | Korenman | A61B 5/0017 600/547 |
| 6,305,943 B1 | * | 10/2001 | Pougatchev et al. | 434/262 |
| 6,662,032 B1 | | 12/2003 | Gavish | |
| 6,736,759 B1 | | 5/2004 | Stubbs et al. | |

(Continued)

FOREIGN PATENT DOCUMENTS

JP 2002301047 10/2002

OTHER PUBLICATIONS

International Search Report and Written Opinion for PCT/US2013/076478 dated Apr. 29, 2014.

(Continued)

*Primary Examiner* — Sam Yao
*Assistant Examiner* — Alvin Carlos
(74) *Attorney, Agent, or Firm* — RatnerPrestia

(57) ABSTRACT

Systems, methods and apparatus for breath training are disclosed. The systems and apparatus may comprise an output device, at least one sensor configured to detect physiological data from a trainee, and a data processor coupled to the output device and the at least one sensor, the data processor configured to provide instructions to a trainee through the output device based on a breath training regimen and to receive and analyze the physiological data detected from the at least one sensor. The methods may comprise the steps of instructing a trainee based on a breath training regimen, detecting physiological data from the trainee through at least one sensor, analyzing physiological data and providing feedback to the trainee based on the analyzed physiological data.

25 Claims, 14 Drawing Sheets

(56) References Cited

U.S. PATENT DOCUMENTS

| | | | |
|---|---|---|---|
| 8,658,878 B2* | 2/2014 | Wagner | A61B 5/1135 |
| | | | 482/13 |
| 8,672,852 B2* | 3/2014 | Gavish | 600/483 |
| 2003/0059750 A1* | 3/2003 | Bindler | G06Q 10/10 |
| | | | 434/236 |
| 2005/0124906 A1* | 6/2005 | Childre et al. | 600/529 |
| 2006/0155167 A1* | 7/2006 | Elliott | 600/125 |
| 2008/0146957 A1* | 6/2008 | Wasnick | 600/534 |
| 2009/0227425 A1 | 9/2009 | Shirasaki et al. | |
| 2009/0263773 A1* | 10/2009 | Kotlyar | G09B 19/003 |
| | | | 434/262 |
| 2010/0240945 A1* | 9/2010 | Bikko | 600/28 |
| 2011/0181422 A1 | 7/2011 | Tran | |
| 2011/0195387 A1* | 8/2011 | Hsiao et al. | 434/265 |

OTHER PUBLICATIONS

Extended European Search Report for European Application No. 13865912.3-1958 dated May 2, 2016.

* cited by examiner

| 400 | 402 | 404 |
|---|---|---|
| Instructions to User | Head-set Measurements | Alert/Advise |
| 1. Breathe normally for 3 minutes. | • Respiratory Rate (f),<br>• Time Taken for one breath (Ttot)<br>• Time taken for inspiration (TI),<br>• Time taken for expiration (TE),<br>• Mean Breath Amplitude<br>• Augmented Breaths (Amplitude of at least 2.5x previous breath)<br>• Heart Rate Variability ( (HR max-HR min and SDNN) | Not applicable |
| 2a Breathe normally and hold your breath after you breath out until you feel the first definite urge to breath. At the end of the breath hold, take the first breath through your nose. | • Time-Seconds till first breath<br>• Breath Amplitude to calculate number of augmented breaths<br>• Heart Rate | ADVISE- More than 5 augmented breaths advise may have held too long.<br>ALERT: if HR >120 |
| 2b. Breathe normally and hold your breath after you breath out until you feel your breathing muscles react. | • Time-Seconds till first breath<br>• Breath Amplitude to calculate number of augmented breaths<br>• Heart Rate | ADVISE- More than 5 augmented breaths advise may have held too long.<br>ALERT: if HR >120 |
| 3. From normal breathing, gradually slow down until you breathing as slowly as you comfortably can. Aim for about 6 breaths per minute. Count in for 4 seconds and out for 6 seconds. | • Respiratory Time and Amplitude Measures.<br>• Respiratory Variability Measures<br>• Heart Rate<br>• HR Max- HR Min | ADVISE: focus on longer exhalation if increase in following measures is >20%; f, HR, augmented breaths, TI/Ttot |
| 4. From normal breathing, hold your breath until you feel a strong need to breath. | • Time-Seconds till first breath<br>• Breath Amplitude to calculate number of augmented breaths<br>• Heart Rate | ADVISE: if longer than 2x 2a<br>ADVISE: if more that 10 augmented breath at end of this breath hold |
| 5. From normal breathing gradually make breaths smaller and shorter, while staying relaxed. | • Respiratory Time and Amplitude Measures.<br>• Respiratory Variability Measures<br>• Heart Rate | ADVISE-If not evident aim for smaller and shorter breaths.<br>ALERT: if increase in HR >120 |
| Repeat 3,4, 5 in sequence 2-3 times<br>Breathe normally and hold your breath until you feel the first definite urge to breath. At the end of the breath hold, take the first breath through your nose.<br>Repeat 1. | • Time-Seconds till first breath<br>• Breath Amplitude to calculate number of augmented breaths<br>• Heart Rate- | ADVISE- If augmented breaths continue for more than 5 breaths<br>ALERT-if HR >120 |

1102 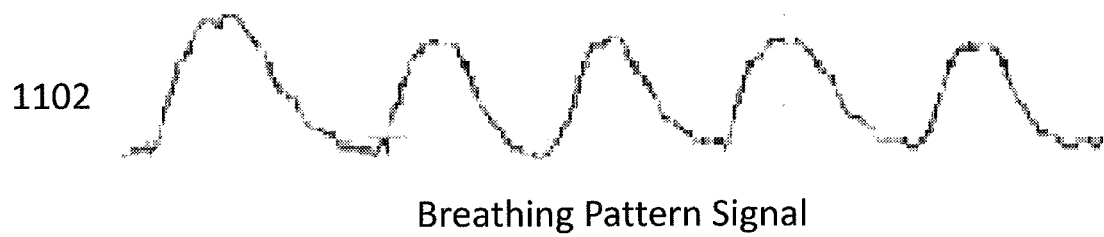
Breathing Pattern Signal
1104 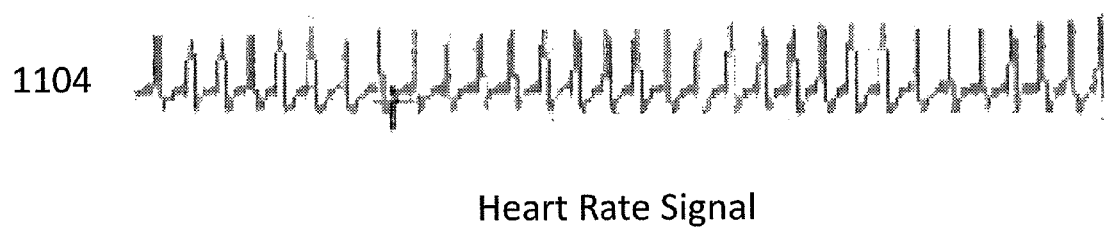
Heart Rate Signal
1106 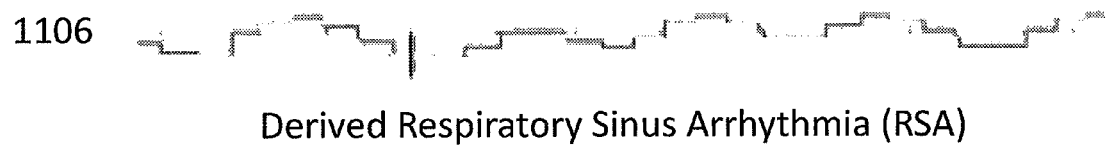
Derived Respiratory Sinus Arrhythmia (RSA)
1100
FIG. 11
(Prior Art)

1200

ND Systems, METHODS, AND
APPARATUS FOR BREATH TRAINING

RELATED APPLICATIONS

The present application claims priority to U.S. provisional application Ser. No. 61/740,092 filed Dec. 20, 2012, titled AUTOMATIC SYSTEMS, METHODS, AND APPARATUS FOR BREATH TRAINING, and U.S. provisional application Ser. No. 61/825,973 filed May 21, 2013, titled SENSOR MODULE FOR BREATHING TRAINING, the contents of both are incorporated fully herein by reference.

FIELD OF THE INVENTION

The invention relates to automated systems, methods, and apparatus for breath training.

BACKGROUND OF THE INVENTION

There is significant interest to improve the general health and quality of life of the population by enhancing healthcare delivery systems in terms of quality, outcomes and costs. Also, there is a growing awareness by individuals that, by improving their lifestyles, they may prolong their lives, mitigate the symptoms of existing chronic disease states, delay the onset of chronic disease states and lower the long-term impact of such diseases and their treatment while reducing overall healthcare costs.

Asthma, sleep apnea, and chronic obstructive pulmonary disease (COPD) affect millions each year. There is extensive clinical evidence that sufferers of these afflictions may significantly reduce their dependence on pharmaceutical interventions and mitigate against severe attacks by undertaking a program of breath training. There are only a few experts in breath training for asthma, sleep apnea, and COPD, thus the benefits of such training have not been available to a large population of sufferers. Aspects of the invention described herein enable a large population of sufferers to undertake effective breath training in their home and at a reasonable cost.

SUMMARY OF THE INVENTION

Aspects of the invention are embodied in systems and apparatus for breath training. The systems and apparatus may comprise an output device, at least one sensor configured to detect physiological data from a trainee and a data processor coupled to the output device and the at least one sensor where the data processor is configured to provide instructions to the trainee through the output device based on a breath training regimen and is configured to receive and analyze the physiological data detected from the sensor(s).

Other aspects of the invention are embodied in methods for breath training. The methods may comprise the steps of instructing a trainee based on a breath training regimen, detecting physiological data from the trainee through at least one sensor, analyzing the physiological data, and providing feedback to the trainee based on the analyzed physiological data.

The systems, apparatus, and methods of the invention are beneficial in that a trainee can undergo breath training asynchronously with a breath training expert at a time and location of the trainee's choosing, thereby expanding the availability of breath training.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. This emphasizes that according to common practice, the various features of the drawings are not drawn to scale. On the contrary, the dimensions of the various features are arbitrarily expanded or reduced for clarity. Included in the drawings are the following figures:

FIG. 4 is a chart containing breath instructions, measurements and alerts in a breath training regimen according to aspects of the invention;

FIG. 11 is an arrangement of graphs depicting data detected during a breath training session in accordance with aspects of the invention;

DETAILED DESCRIPTION OF THE INVENTION

Figure 1:
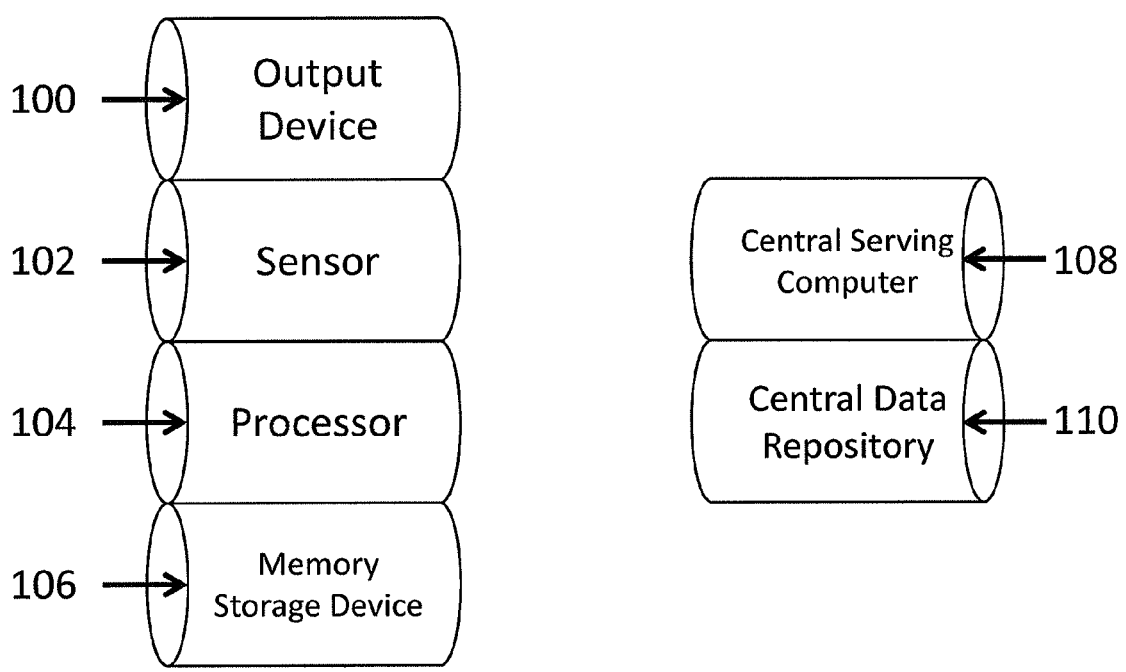
FIG. 1 is a block diagram depicting a system for breath training according to aspects of the invention.

FIG. 1 depicts a breath training system 10 in accordance with aspects of the present invention. The illustrated breath training system 10 includes an output device 100, at least one sensor 102, a processor 104 coupled to the output device 100 and the at least one sensor 102, a memory storage device 106, a central serving computer 108, and a central data repository 110.

The output device 100 may be configured to communicate breath training instructions to a trainee based on a breath training regimen. As referred to herein, a "trainee" is a person or persons or other entity to whom breath training is directed. The output device 100 may communicate breath training instructions from a breath training regimen through video and/or audio communication media to a trainee. The output device 100 may be an audio device such as a speaker, headphone(s), ear bud(s), etc. for aurally communicating breath training instructions. Alternatively, or additionally, the output device 100 may be a video device, such as a display configured for visually communicating breathing instructions via text or illustrations. In an embodiment, the output device 100 is configured to be wearable by the trainee. Other suitable output devices for communicating breath training instructions to a trainee will be understood by those of skill in the art from the description herein.

At least one sensor 102 is configured to detect physiological data from a trainee during a breath training regimen. In one embodiment, a plurality of sensors 102 are configured to detect physiological data. The physiological data detected by a sensor 102 may include heart rate, nasal inhalatory breath flow, nasal exhalatory breath flow, oral inhalatory breath flow, oral exhalatory breath flow, blood gas concentration, blood pressure, tidal carbon dioxide ($CO_2$), blood glucose concentration, voluntary hypoxic state frequency, pneumophonographic sounds, etc. In an embodiment, the physiological data includes blood oxygen saturation level. Other physiological data suitable to be detected for a breath training system 10 will be recognized by one of skill in the art from the description herein. The at least one sensor 102 may be a nasal cannula, an oral cannula, a heart-rate sensor, a microphone, a blood dissolved gas level sensor, a photoplethysmograph sensor, a $CO_2$ sensor for exhaled breath, a blood pressure sensor, a blood glucose sensor, and/or a brain activity sensor and/or any combination of the aforementioned sensors. The sensor 102 may be a sensor positioned on a digit, an appendage such as an ear, in a cavity such as the nasal cavity or the ear canal, or in the vicinity of the trainee. As used herein, the term "digit" refers to a finger, fingers, and/or thumb of a hand. Other suitable sensors for detecting physiological data in a breath training system 10 will be understood by one of skill in the art from the description herein.

A data processor 104 is coupled to the output device 100 and the at least one sensor 102. The data processor 104 may be physically coupled to these devices (e.g., via wires, circuit board tracks, etc.) and/or wirelessly coupled to these devices (e.g., via near field communication (NFC), Bluetooth, 802.11, or other types suitable for wireless coupling). The data processor 104 provides breath training instructions to a trainee through the output device 100. The data processor 104 is also configured to receive and analyze the physiological data detected by the at least one sensor 102. The data processor 104 may be configured to analyze the physiological data to determine the identity of a trainee. The data processor 104 may also be configured to analyze the physiological data to determine the compliance of a trainee to a breath training regimen. In one embodiment, the data processor 104 is configured to analyze the physiological data to determine the efficacy of a breath training regimen. Breath training feedback based on the analyzed data may be provided to a trainee by the data processor 104. In one embodiment, the feedback is provided to the trainee by the data processor 104 asynchronously to the breath training regimen such that the trainee can conduct a breath training session independently without personal supervision and at a later time submit the data recorded from the breath training session to the data processor 104 in order to be provided with feedback. The feedback provided may an updated breath training regimen. As used herein, the term "data processor" refers to one or more processors configured to perform the functionalities attributable to the data processor described herein. In one embodiment, the data processor 104 is the processor within a smart phone (e.g., iPhone®, Blackberry®, etc.) or tablet device. In other embodiments, the data processor 104 may be a data processor within a device dedicated to providing breath training. In other embodiments, the data processor 104 may include a remotely located processor that may be located at the central serving computer 108 and/or the central data repository 110.

A memory storage device 106 may be coupled to data processor 104, the at least one sensor 102, and/or the output device 100. The memory storage device 106 may be configured to store physiological data sensed from the at least sensor 102, physiological data analyzed by data processor 104, breath training regimens, and/or feedback provided to a trainee by data processor 104.

The system 10 may include a central serving computer 108 and a central data repository 110 coupled to the central serving computer 108. In one embodiment, data processor 104 is coupled to the central serving computer 108. The central serving computer 108 may be configured to receive physiological data transmitted by the data processor 104. In such embodiments, the physiological data may be transmitted wirelessly, and/or by direct wired connection between the data processor 104 and the central serving computer 108. The central data repository 110 may be configured to store a library of breath training regimens. The central data repository 110 may be configured to store and analyze physiological data from a plurality of trainees. In one embodiment, the central serving computer 108 and/or the central data repository 110 are configured to comparatively analyze the physiological data from the plurality of trainees with the received physiological data from the data processor 104 to provide feedback to a trainee. The central serving computer 108 and/or the central data repository 110 may be configured to provide a trainee with feedback. The feedback may be provided asynchronously to a trainee. The feedback may be in the form of an updated breath training regimen.

The breath training system 10 depicts an exemplary embodiment. Those of skill in the art will recognize and appreciate that suitable alternative system configurations may be used in accordance with aspects of the invention.

Figure 2:
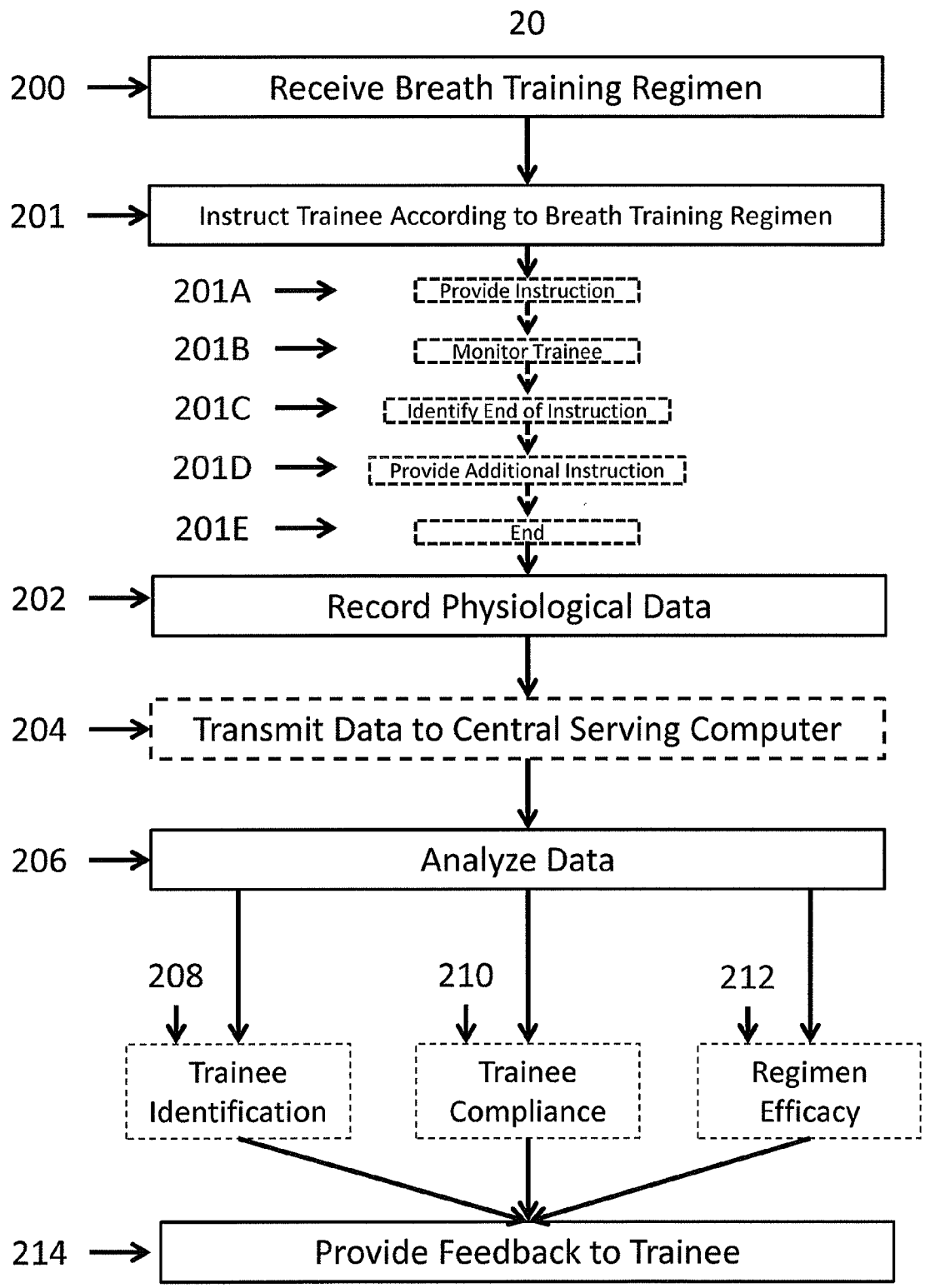
FIG. 2 is a flowchart depicting a method for breath training according to aspects of the invention.

FIG. 2 depicts a flowchart 20 of steps for breath training according to aspects of the present invention. Although references to the system 10 and components of FIG. 1 are made in conjunction with the method depicted in flowchart 20, one of skill in the art will recognize suitable alternative systems and/or components that may be used to conduct the method of flowchart 20.

At block 200, a trainee receives a breath training regimen. The regimen may be prescribed. In one embodiment, the trainee downloads the breath training regimen from a remote location, e.g., via the Internet. The trainee may download the regimen as an application (app) for a smart phone or tablet device. In other embodiments, one or more breath training regimens may be preloaded in the breath training system 10. Other suitable methods for receiving a breath training regimen will be understood by one of skill in the art.

At block 201, a trainee is instructed according to a breath training regimen. The instructions may be communicated to the trainee by the data processor 104 through an output device 100. In one embodiment, the instructions are based on a pre-determined regimen for the trainee. The instructions may be stored in a memory storage device 106 and retrieved by data processor 104 for communicating to the trainee via the output device 100.

Blocks 201A-201E are exemplary steps for instructing a trainee according to a breath training regimen. At block 201A, an instruction is provided to the trainee. The instruction may be a breathing action (e.g., natural breathing, short breath hold, long breath hold, small breathing, etc.). Other breathing actions suitable as an instruction will be understood by those of skill in the art. At block 201B, the trainee is monitored. The monitoring may be conducted to determine the compliance of the trainee to the instruction of block 201A. The monitoring may be performed by recording specified physiological data. At block 201C, the end of the instruction is identified. The trainee may be alerted as to the end of instruction by audio and/or video prompt. The end of the instruction may be based on a predetermined time, monitoring physiological data (e.g., the end of a long breath hold instruction may be identified by a rise in blood oxygen), etc. At block 201D, the next instruction is optionally provided to the trainee according to the breath training regimen. If there are no more instructions in the regimen, the instructing step of block 201 ends at block 201E. The instructing step described above is exemplary and not exclusive such that those of skill in the art will recognize and appreciate other suitable instructing methods for effectuating the invention described herein.

At block 202, physiological data is recorded from a trainee. The physiological data from the at least one sensor 102 may be recorded by the data processor 104 in the memory device 106. Physiological data recorded from a trainee may include heart rate, nasal inhalatory breath flow, nasal exhalatory breath flow, oral inhalatory breath flow, oral exhalatory breath flow, blood gas concentration, blood pressure, tidal $CO_2$, blood glucose concentration, voluntary hypoxic state frequency, rest breathing frequency, flow profile, etc. In an embodiment, the physiological data is blood oxygen saturation level of the trainee. The heart rate and blood oxygen saturation level of the trainee may be continuously detected by sensors 102 that may be placed on an ear lobe, within an ear canal, or on a digit.

At block 204, the physiological data recorded at block 202 is optionally transmitted to a remote processor, e.g., central serving computer 108. The central serving computer 108 may be configured to analyze the physiological data. In one embodiment, the physiological data is uploaded via a wireless transmission. In an alternative embodiment, the physiological data is uploaded via a wired connection from a memory storage device 106.

At block 206, the physiological data is analyzed. The physiological data may be analyzed in order to determine the identity of the trainee, the compliance of a trainee to the breath training regimen, and/or the efficacy of the breath training regimen. Additional analyses of the physiological data suitable for a breath training system 10 will be understood by one of skill in the art from the description herein.

At block 208, the physiological data may be analyzed to determine the identity of the trainee. The determined identity of the trainee may be used to ensure the trainee receives the correct breath training regimen. In one embodiment, the determined identity of the trainee is used to ensure the appropriate feedback corresponding to the trainee is provided in block 214. Physiological data suitable to determine the identity of a trainee include cardiac, pulmonary, chemical and/or biochemical patterns, etc. Other suitable data will be recognized by one of skill in the art. In one embodiment, the trainee is unaware that the physiological data detected is analyzed to determine the trainee's identity so as to increase the effectiveness of identity determination. In an embodiment, physiological data for up to five trainees is stored in a memory storage device 106 of system 10 such that multiple trainees may be identified by and use the system 10. In accordance with this embodiment, system 10 may identify the current trainee, e.g., for the purposes of determining the correctness of the regimen for the trainee, determining compliance of the trainee to the regimen, determining the efficacy of the breath training regimen for the trainee, and/or providing appropriate feedback corresponding to the trainee. It is contemplated that physiological data for more than five trainees may be stored in a memory storage device 106 of system 10. Patterns of breathing may be used as data to determine the identity of the trainee. Patterns of breathing may include breathing frequency, expiratory and inspiratory durations and their ratio, tidal volume, drive and timing components of breathing, flow profile, breath to breath variations, frequency of augmented breathing behaviors, etc. In an embodiment, heart rate variability occurring in low frequency bands is analyzed to determine the identity of the trainee. In one embodiment, pneumophonography, whereby the analysis of sound signals generated during inhalation and exhalation are used to determine the condition of the pulmonary system in humans, may also be analyzed to determine the identity of a trainee. In another embodiment, trainee responses to specific training regimens may be used to determine the identity of a trainee by comparing longitudinal data on breathing performance over time from one trainee to another trainee. It is contemplated that any combination of analyses described above may be used to determine the identity of a trainee.

At block 210, the physiological data may be analyzed to determine the compliance of a trainee to a breath training regimen. Physiological data that can be analyzed to determine compliance may include over-breathing, augmented breathing, breath-holding, etc. Other types of physiological data suitable for analysis in determining compliance of a trainee to a breath training regimen will be understood by one of skill in the art from the description herein.

At block 212, the physiological data may be analyzed to determine the efficacy of the breath training regimen. Physiological data that can be analyzed to determine the efficacy of the breath training regimen include elevated heart rate, augmented breathing, irregular or interrupted breathing patterns, breath holding sequences, overbreathing, respiratory sinus arrhythmia (RSA), compliance to regimen, etc. Other physiological data suitable to determine the efficacy of a breath training regimen will be understood by those of skill in the art from the description herein. In one embodiment, an expert analyzes the physiological data to determine the efficacy of a breath training regimen. In an embodiment, a central data repository 110 stores physiological data from a plurality of trainees comparatively analyzes the data to determine efficacy of a breath training regimen. In one embodiment, an expert may comparatively analyze the data stored in the central data repository 110 to the data detected from a trainee to determine the efficacy of a breath training regimen. The data may be encrypted so as to maintain the anonymity of the trainees.

At block 214, feedback is provided to the trainee. The feedback may be transmitted from a central serving computer 108 or from a data processor 104. In one embodiment, the feedback is a trend line representing the progress of a trainee with respect to a breath training regimen. The trend line may compare the progress of a trainee to other trainees. In an embodiment, the feedback is in the form of an updated breath training regimen based on the analyzed data. In embodiments where the feedback is in the form of an updated breath training regimen, the updated regimen may be selected by an expert based on comparative analysis of data from a plurality of trainees. In one embodiment, the updated breath training regimen is selected based on comparative analysis of data from a plurality of trainees in a central data repository 108. In an embodiment, the feedback is provided asynchronously to the trainee completing the breath training regimen. Other forms of feedback that can be provided to a trainee based on the data detected and analyzed will be understood by one of skill in the art from the description herein.

The example below describes an embodiment according to aspects of the present invention and is not exclusive. One of skill in the art will recognize other suitable applications for breath training in the areas of healthcare, wellness management, sports training, military training and other fields from the disclosure herein. Although references to the system 10 and components of FIG. 1 and to flowchart 20 and steps of FIG. 2 are made in conjunction with the example described below, one of skill in the art will recognize suitable alternative systems, components, and/or methods may be used to practice the example below.

Figure 3:
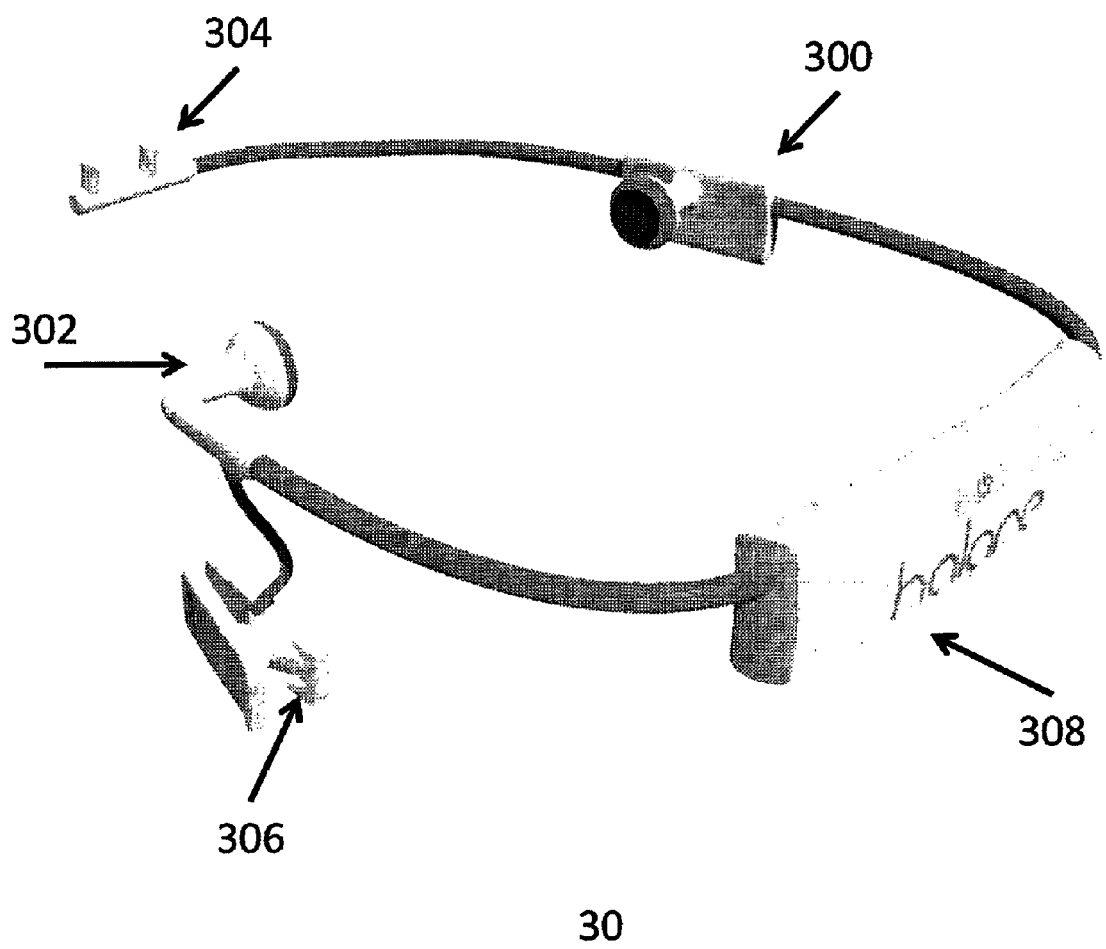
FIG. 3 is a depiction of a system configured for breath training according to aspects of the invention.

FIG. 3 depicts a device 30 in the form of a wearable headset. The system 30 includes sound generating devices 300, 302, which reside in the area of one or both ears of a trainee. A nasal cannula 304 to be inserted into the nasal passages of a trainee is connected to a pressure sensor (not shown) via a hollow tube (not shown). An ear-clip 306 to be attached to the lobe of one ear of a trainee may configured to sense heart rate, blood oxygen saturation level, or other physiological data as described herein. A data output mechanism (not shown) may be positioned on the inner surface of sound generating device 300, such that connection to a network can occur only when a trainee is not wearing the system 30. An electronic module 308 may be configured to house a physiological sensor 102, a data processor 104, a memory storage device, 106, and/or a transmitter for uploading data to and receiving data from a central serving computer 108. In an embodiment where the electronic module 308 houses a memory storage device 106, the memory storage device 106 may store trainee selected music or sound files, one or more breath training regimens, and/or a digital library of voice prompts that are played to the trainee at appropriate times during the training session. The trainee places the system 30 on his or her head with the sound generating device(s) 300, 302 in the area of his or her ear(s), places the cannula 304 into his or her nasal passages, and clips the ear-clip 306 onto his or her ear lobe. The trainee then receives instructions based on a breath training regimen that was either stored on the memory storage device 106 or received from a central serving computer 108. Other configurations for an output device will be understood by one of skill in the art from the description herein.

FIG. 4 depicts a chart 40 of a typical sequence of breath training instructions for a trainee with general dysfunctional breathing symptoms in accordance with aspects of the invention. The left hand column 400 is illustrative of the verbal instructions given to the trainee. The center column 402 lists the physiological data that may recorded during the breath training session. The right hand column 404 contains scenarios based on the recorded physiological data in column 402 in which the trainee can be alerted or advised during the breath training session. Such scenarios may include elevated heart-rate and/or a period of augmented breathing (sighing, yawning, hyperventilating, irregular or interrupted breathing patterns, etc.).

Figure 5:
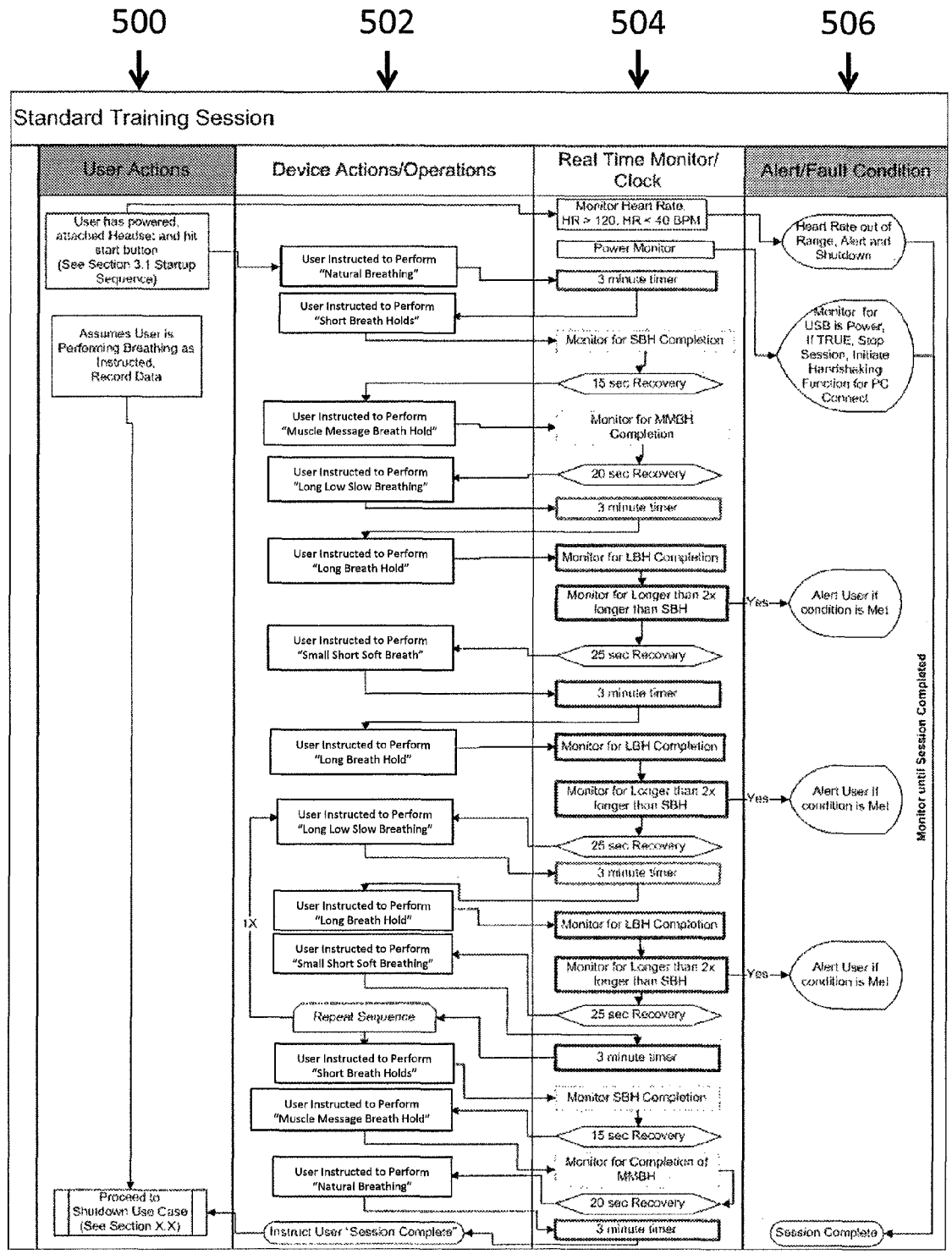
FIG. 5 is a flowchart depicting instructions in a breath training regimen according to aspects of the invention.

FIG. 5 depicts a flowchart 50 showing how the breath training regimen of FIG. 4 may be conducted through a breath training system such as system 10 (FIG. 1) or system 30 (FIG. 3). The data recorded during a breath training session may be stored in the memory device 106 or transmitted to a central serving computer 108 for processing. Column 500 depicts user actions during a breath training regimen according to aspects of the invention. Column 502 depicts breath training instructions communicated to the trainee through the output device 100. Column 504 depicts real time monitoring steps and monitoring durations during the breath training regimen in which physiological data is detected from the trainee through at least one sensor 102. Column 506 depicts alert or fault conditions that may occur during a breath training regimen in response to the trainee's breathing. Other suitable breath training regimens, sequences, instructions and ways to conduct such regimens, sequences, and instructions will be recognized by one of skill in the art from the description herein.

Figure 6A:
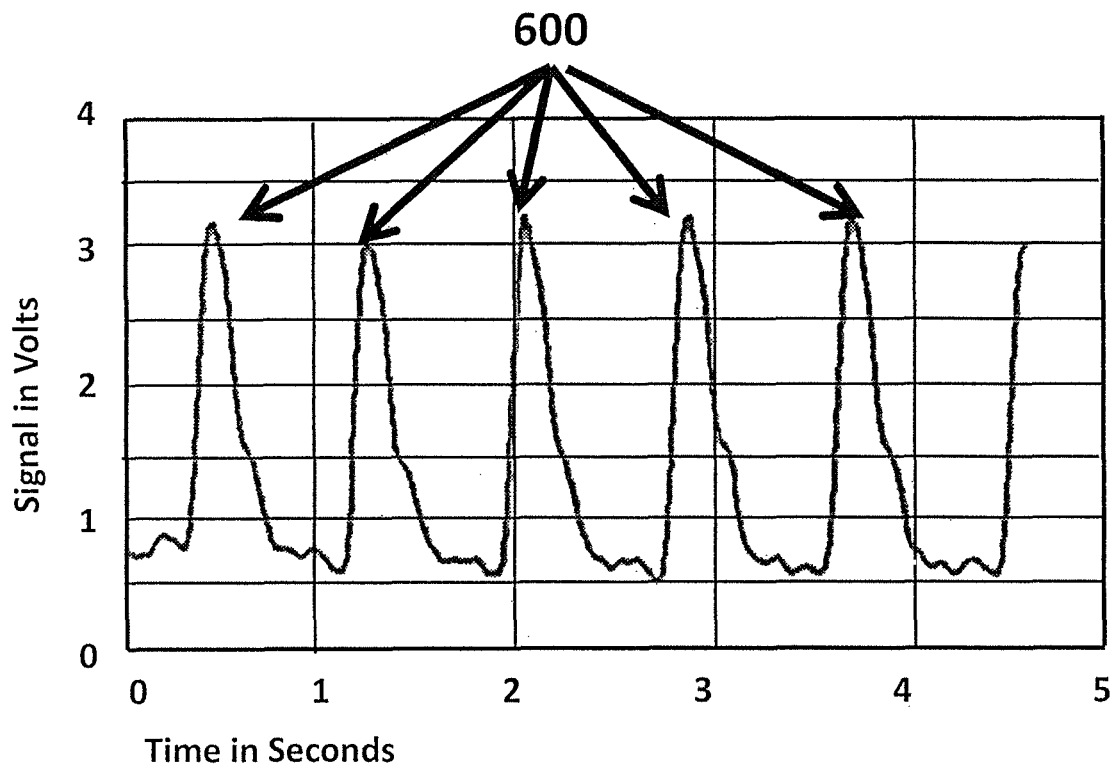
FIGS. 6A and 6B are graphs showing data used to determine low frequency power spectra in accordance with aspects of the invention.
Figure 6B:
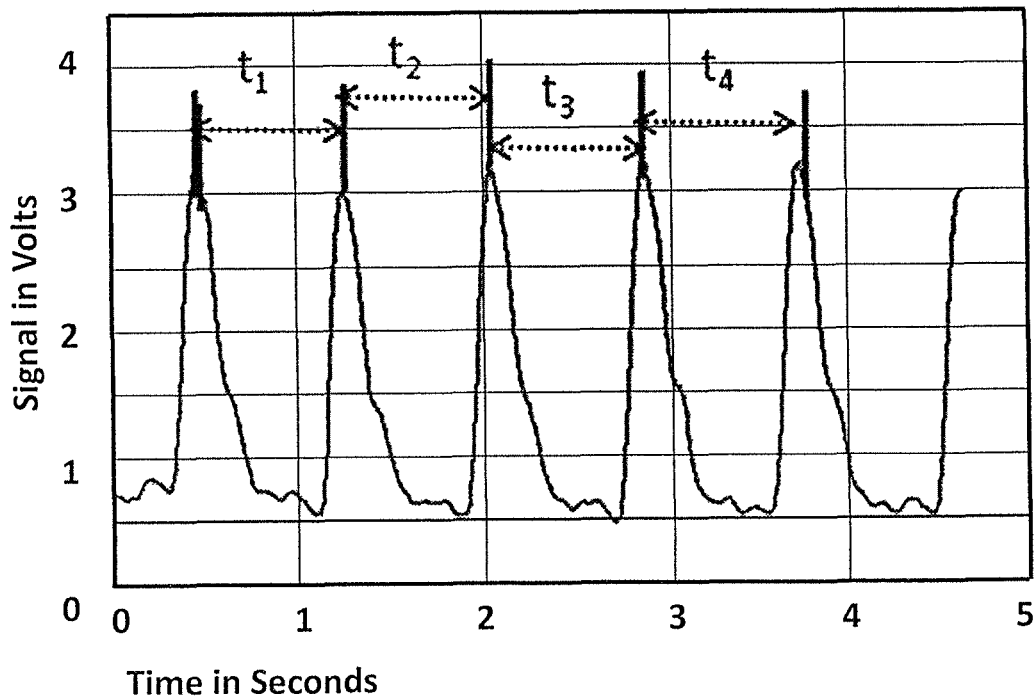

Trainee identity, trainee compliance, and regimen efficacy can be determined by analysis of the data recorded during a breath training session(s). FIG. 6A is a graph showing a typical heart-rate signal from a sensor. Analysis of this data may determine the peak points 600 of the heart-rate signal. FIG. 6B is a graph showing a series of time intervals t1, t2, t3, t4 measured between the peak points 600 of the heart-rate signal. The time intervals may be calculated up to t(n). Sequences where n>500 may be required to collect sufficient time intervals for an accurate identity check of a trainee in systems configured for multiple trainees. The time intervals t1, t2, t3, t4, ..., t(n) of peak points 600 are subjected to a spectrum analysis algorithm (e.g., digital fast Fourier transform) to determine the low frequency components of both power level and frequency of heart beat variability. The power level and frequency of heart beat variability are unique to a specific individual and are used to ensure that the trainee using the system 10, 30 is identical to the trainee for whom the breath training regimen was intended.

Figure 7:
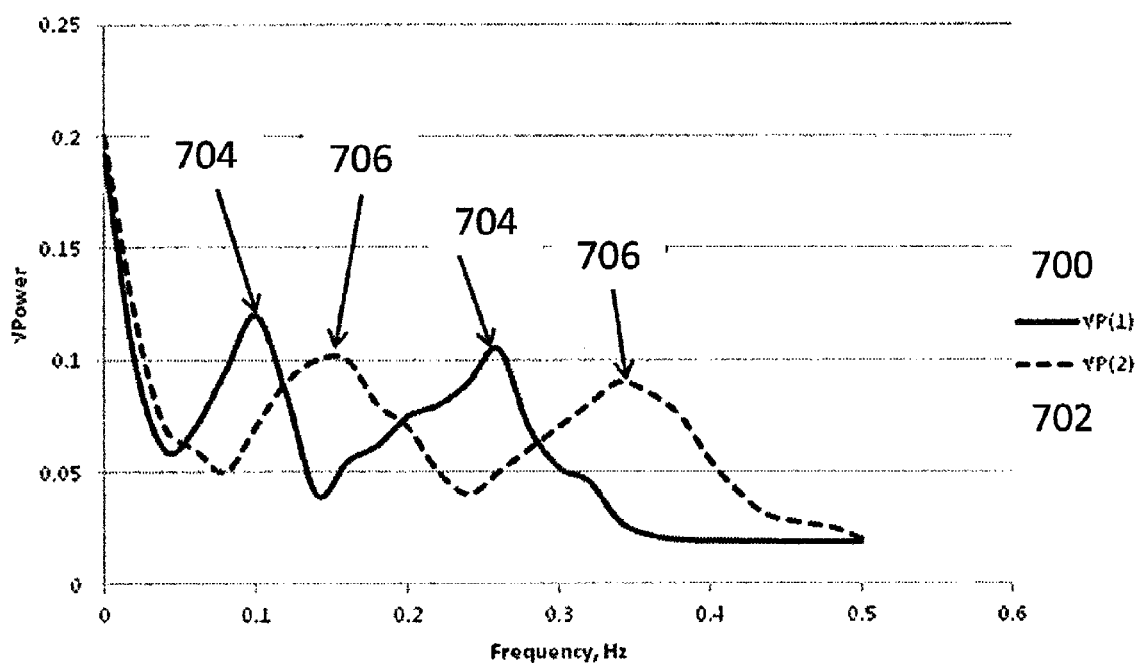
FIG. 7 is a graph of low frequency power spectra in accordance with aspects of the invention.

FIG. 7 is a graph 70 showing the low frequency power spectra of two trainees derived from a time series of peak points in heart-rate using a fast Fourier transform algorithm processing heart-rate time intervals. The first trainee is represented by solid line 700 while the second trainee is represented by dashed line 702. The coordinates of the square root of the power and the frequency are derived for the two lowest frequency components and are shown for the first trainee 704 and the second trainee 706. Comparing each of the two low frequency component frequencies and the ratio of the square root of the power of the two frequencies for each trainee provides sufficient differentiation between trainees and thus may be used for trainee identification.

Figure 8:
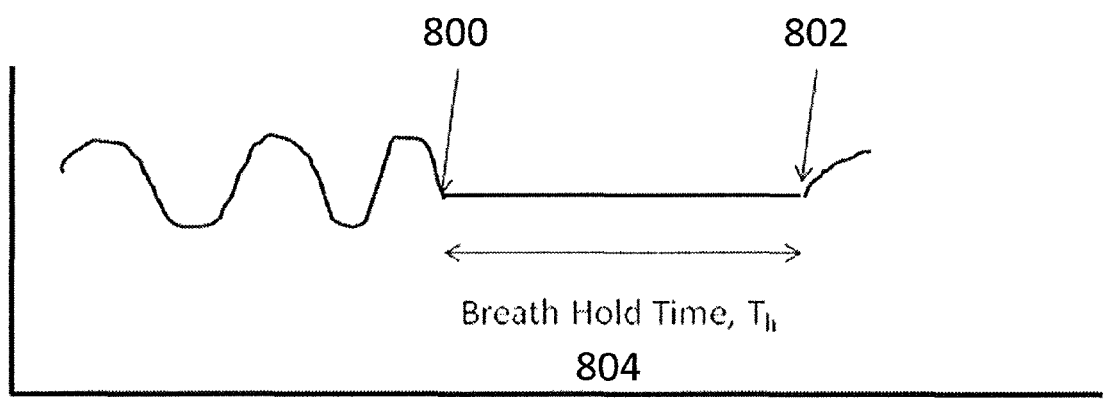
FIG. 8 is a graph depicting data used to detect overbreathing in accordance with aspects of the invention.

FIG. 8 is a graph 80 showing data that can be analyzed from a sensor (e.g., cannula sensor, etc.) to determine a breath holding sequence. The signal from the sensor is electronically filtered to remove the high frequency components and the amplitude of the signal is normalized to the calibration of normal breathing peak value. The transition from normal breathing to breath-holding 800 and then the transition from breath-holding to normal breathing 802 are determined using electronic signal analysis in order to extract the breath hold time 804.

Figure 9:
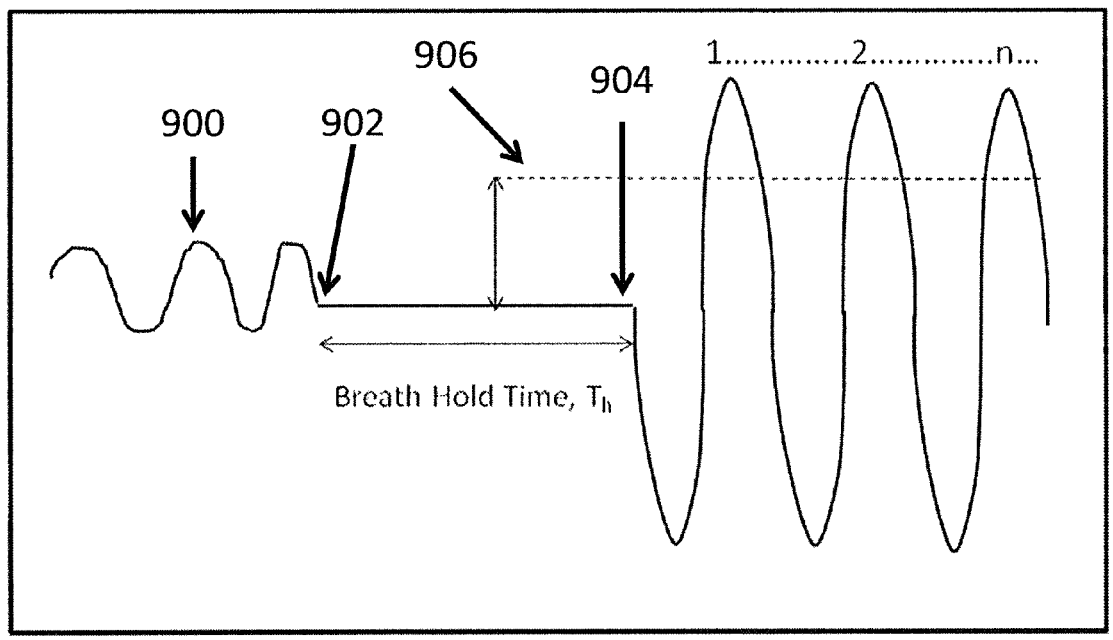
FIGS. 9 and 10 are graphs depicting data used to detect augmented breathing according to aspects of the invention.

FIG. 9 is a graph 90 depicting data analyzed to automatically detect over-breathing. In many breath training regimens, the transitions between different levels and rates of breathing are important. In this example, a trainee has been instructed to transition between normal relaxed breathing 900, to breath holding 902 and back to normal breathing 904. Upon going back to normal breathing 904, the trainee has over-breathed beyond threshold level 906, the threshold level 906 being pre-determined in the breath training regimen. The number of over-breathing cycles may be counted and if the number exceeds a pre-determined value, several actions can be taken and communicated with the trainee via sound generating devices 300,302. The trainee may be advised of the error and instructed to repeat and practice this section or the trainee may be advised to stop the training regimen and seek advice from an expert. A large excursion beyond the threshold level 906 may indicate a transition to hyperventilation, an asthma attack, or some other abnormal behavior which could be harmful to the trainee.

Figure 10:
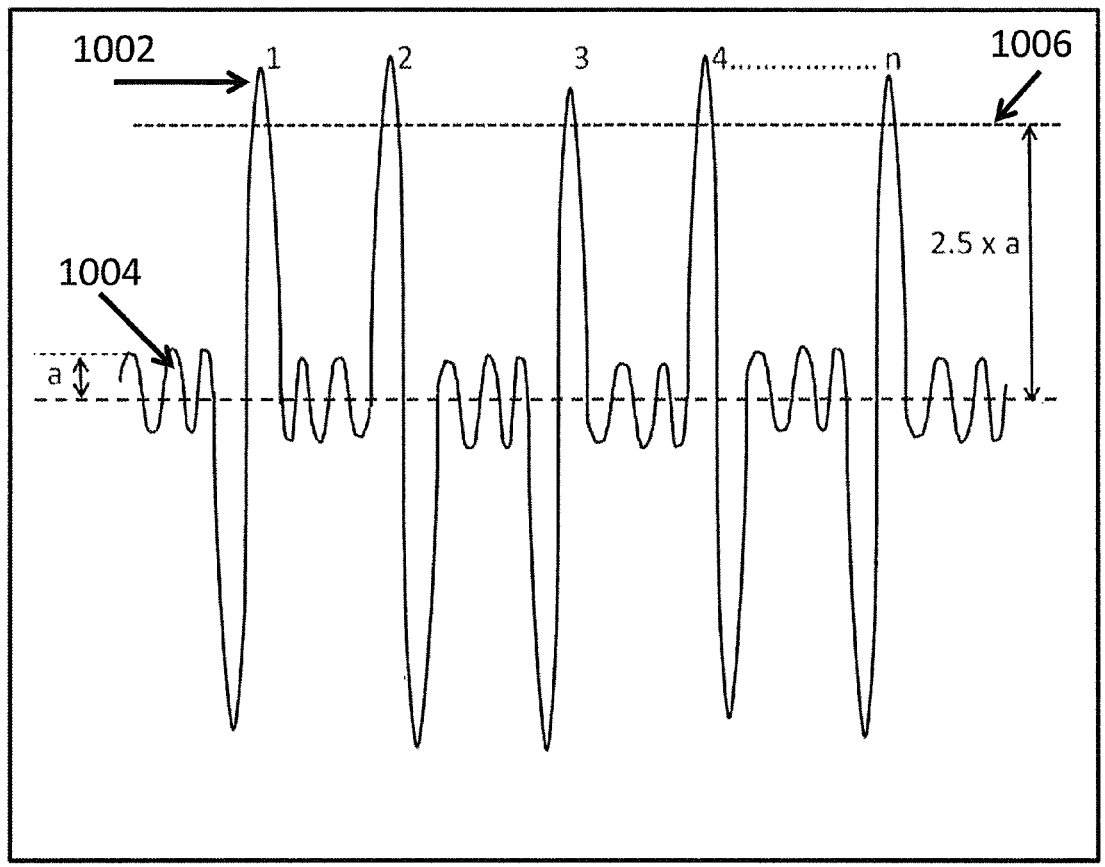

FIG. 10 is a graph 1000 of data analyzed to detect augmented breathing. Augmented breathing includes one or more significant deviations from a regular breathing pattern and can be symptomatic of the existence of a chronic breathing disorder and/or high levels of stress. An augmented event is recorded when there is a deviation from normal relaxed breathing 1004 to breathing with an amplitude higher than the augmented event threshold 1006 (e.g., pre-determined to be 2.5× normal relaxed breathing amplitude). The number of augmented events 1002 is counted and when a total sequence "n" of such events (e.g., 5 or more) within a pre-determined time (e.g., 30-60 seconds) occurs, augmented breathing occurs and is subsequently recorded. Large excursions beyond a pre-determined augmented event threshold 1006 may indicate a transition to hyperventilation, an asthma attack, or some other abnormal behavior which could be harmful to the trainee.

FIG. 11 is an arrangement of graphs 1100 showing data used to determine the progress of breath training. The upper graph 1102 shows a typical breathing pattern measured. The center graph 1104 shows a typical heart rate pattern measured using a heart rate monitoring sensor such as ear-clip 306. The bottom graph 1106 is derived from the two other graphs 1102, 1104 and shows the variation in heartbeats per minute that is synchronized with the breathing pattern of line 1102. This variation is known as the respiratory sinus arrhythmia (RSA). The mean amplitude over several breathing cycles is called the vagal tone. A processor calculates the vagal tone from the sensors detecting the data shown in lines 1102 and 1104, typically averaging over about 1 to about 5 minutes. The value of the vagal tone is an indicator of the health of the autonomic nerve system and may be used as an output parameter to determine the progress of breath training between two or more breath training activities. HRV may also be determined directly from the graph 1104 without the data shown in graph 1102. In this case, algorithms are used to extract variations in heart-rate at substantially lower frequencies than the heart-rate in the range of about 6 to about 20 breaths per minute.

In addition to the data described above, blood oxygen saturation (O2Sat) data may be used to derive various pulmonary related functions as detected from an O2Sat level sensor. For example, cessation of breathing, whether voluntary or not, influences the value of O2Sat. Blood oxygen concentration is known to vary with varying time delays as changes in breathing patterns occur such as interruptions or reductions in breathing levels. Such variations can be analyzed with suitable algorithms to determine key parameters needed to monitor a trainee while undertaking a breath training regimen. These parameters include, but are not limited to, the length of a voluntarily imposed breath holding time, the relative level of breath inhales and exhales, variations in breathing rates, etc. For example, during an involuntary apnea event, the value of O2Sat remains at a high saturation level for a length of time before declining significantly, and the value of O2Sat rises quickly again once breathing is re-established. Thus, O2Sat levels can be used for detecting and recording voluntary breath holding times and hypopnea events, which are an important part of a breath training regimen as described herein. O2Sat also varies slightly in synchronism with breathing cycles and therefore can be used to determine breathing rate and changes in breathing rate.

The data recorded in this example may be analyzed for trends between past and current breathing exercises and a trend line may be created for key output parameters (e.g., the ability to hold breath, lung capacity, rest breathing rate, reduction in the use of pharmaceutical interventions, improvement in sleep patterns, improved sporting performance, increased physical or mental stamina, improved quality of life, etc.). The trend data may be used to provide feedback to the trainee on their progress. In addition, if a key output parameter deviates significantly from the established trend line, and the data from several training sessions lie along a different trend line, it is an indication that a new trainee is using the regimen, and thus can be used for trainee identification purposes.

Figure 12:
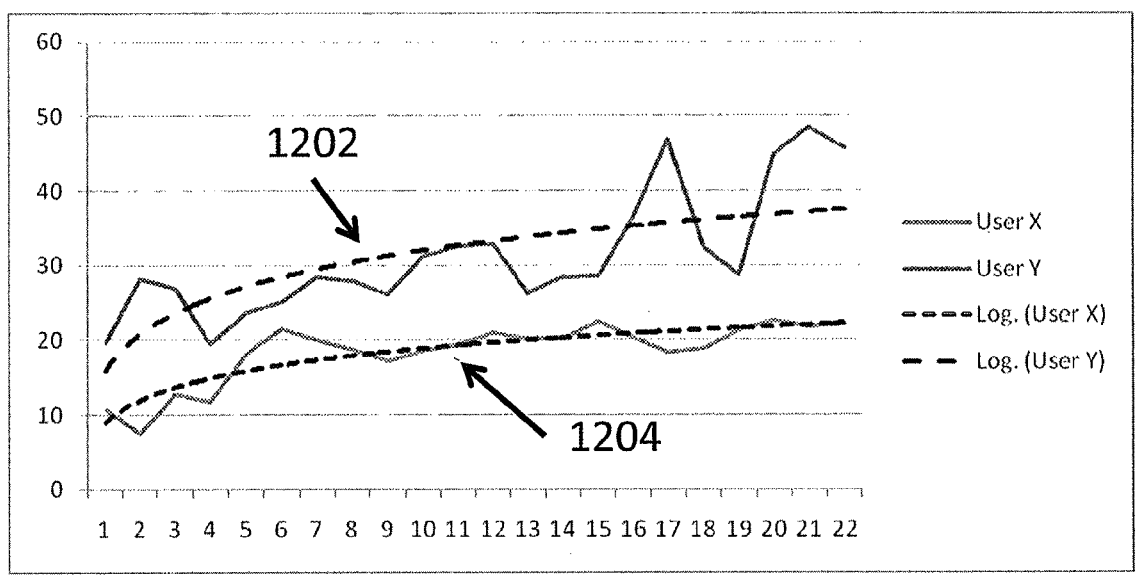
FIGS. 12, 13A, and 13B are graphs depicting feedback trend lines for trainees in accordance with aspects of the invention.

FIG. 12 is a graph 1200 showing a plot of a chosen output parameter on the vertical axis plotted against the number of breathing exercises for trainee X and trainee Y. The dashed trend lines 1202, 1204 show the trend of each trainee to the chosen output parameter. If trainee X's data shifts abruptly to that of trainee Y, then it is likely that two different trainees are using the regimen intended for just one. In this way, trend data for output parameters can be used to determine the identity of the trainee within a pre-determined population.

Figure 13A:
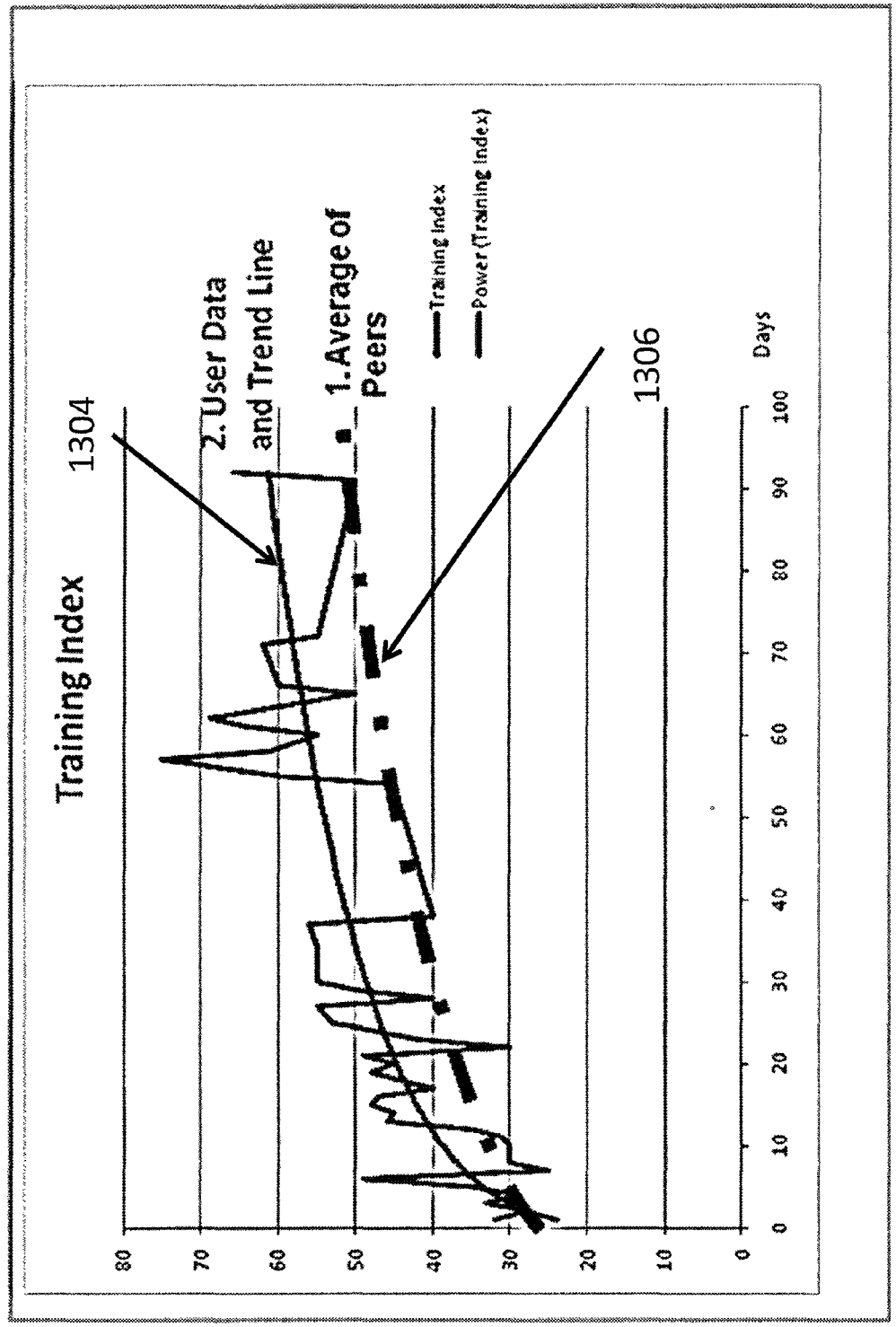
Figure 13B:
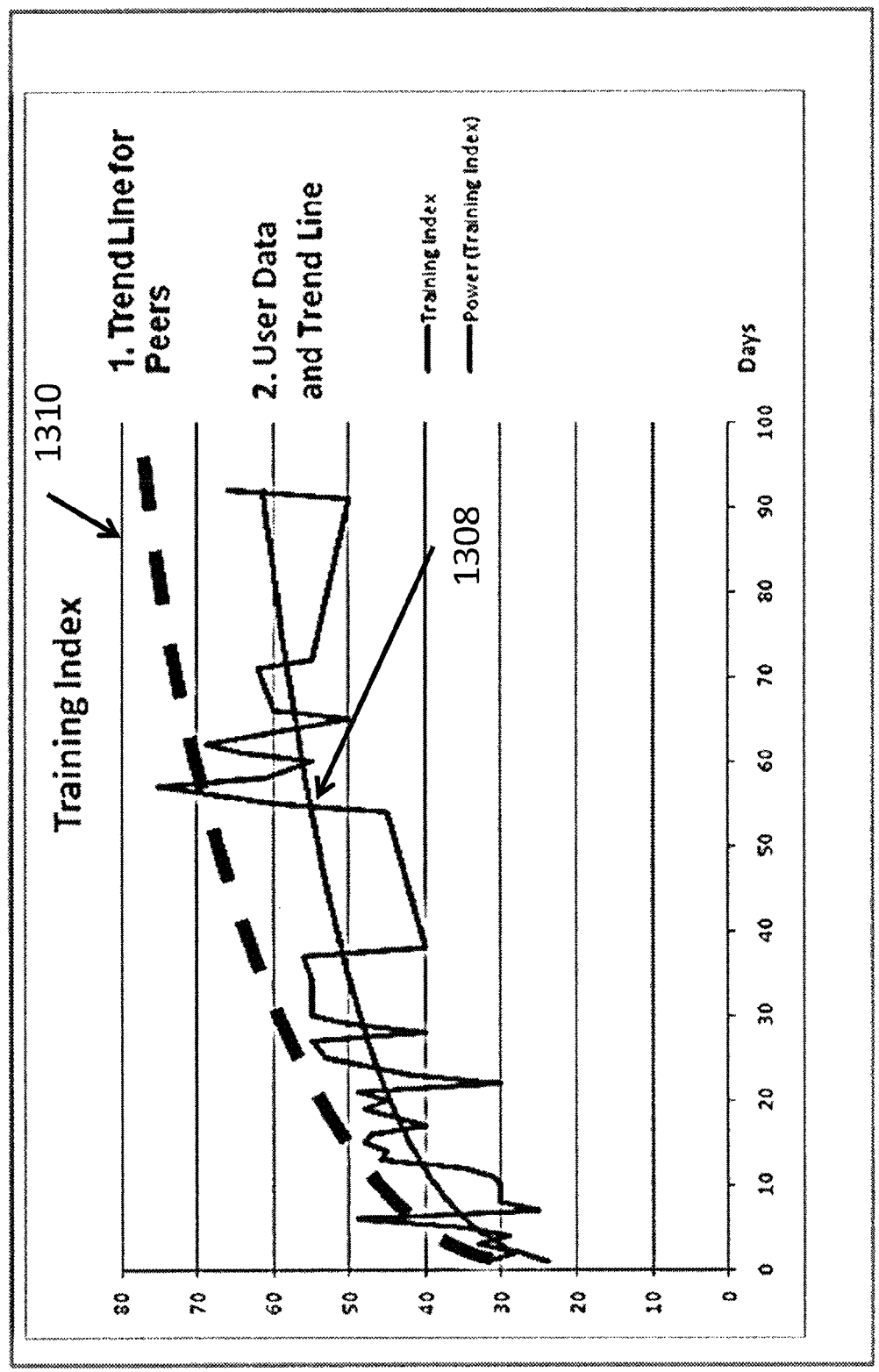

FIGS. 13A and 13B are graphs 1300, 1302 depicting the trend lines of a trainee as compared to the trend lines of a plurality of trainees that can be used to provide feedback regarding the effectiveness of the regimen. In graph 1300, the trend line of the trainee 1304 indicates a higher output performance than the trend line of a plurality of trainees 1306, thus demonstrating the effectiveness of the breath training regimen to the trainee. In graph 1302, the trend line of the trainee 1308 indicates a lower output performance than the trend line of a plurality of trainees 1310, thus demonstrating the possible ineffectiveness of the breath training regimen to the trainee.

Based on these trend lines, it is possible to predict how many training sessions will be required for a trainee to reach a certain percentage of output performance level of their ultimate capability. The trend lines, in the form of feedback, aid in compliance to a regimen and provide encouragement for trainees to continue their training exercises. The trend lines can also be used to determine when and if a trainee can benefit from a change in regimen, such changes including new regimens and an increase or decrease in the intensity or timing of the current regimen.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for breath training, the system comprising:
   an output device;
   at least one sensor configured to detect physiological data from a trainee during a first breath training regimen, the first breath training regimen comprising a plurality of instructions, wherein detected physiological data includes blood oxygen saturation level; and
   a data processor coupled to the output device and the at least one sensor, the data processor configured to:
   provide instructions as part of the first breath training regimen to the trainee through the output device, the instructions including instructing the trainee to hold their breath,
   receive the physiological data detected from the at least one sensor during the first breath training regimen,
   analyze the physiological data that was detected during the first breath training regimen to determine when the trainee has resumed normal breathing using the detected blood oxygen saturation level and to determine a compliance of the trainee with the first breath training regimen based on the physiological data detected after the instruction instructing the trainee to hold their breath and before the determination of when the trainee has resumed normal breathing, and provide feedback to the trainee after the trainee completes the first breath training regimen that is based on the analysis of the physiological data received during the first breath training regimen, the feedback including a second breath training regimen that is based on the determined compliance of the trainee with the first breath training regimen.

2. The system of claim 1, further comprising a memory storage device coupled to the data processor, the memory storage device configured to store the physiological data.

3. The system of claim 1, wherein the second breath training regimen is updated based on the first breath training regimen.

4. The system of claim 1, further comprising a central serving computer configured to receive the physiological data of the trainee and to provide feedback to the trainee based on the received data.

5. The system of claim 4, wherein the second breath training regimen is updated based on the first breath training regimen.

6. The system of claim 4, further comprising a central data repository configured to store analyzed physiological data from a plurality of trainees.

7. The system of claim 6, wherein the feedback is based on comparative analysis of the physiological data of the trainee received by the central serving computer and the analyzed physiological data from the plurality of trainees stored in the central data repository.

8. The system of claim 4, wherein the feedback is selected by an expert.

9. The system of claim 1, wherein the physiological data comprises blood oxygen saturation level.

10. The system of claim 1, wherein the data processor is further configured to determine the identity of the trainee based on the physiological data.

11. The system of claim 1, further comprising an apparatus configured to include the output device, the at least one sensor and the data processor.

12. The system of claim 11, wherein the apparatus is further configured to be wearable by the trainee.

13. The system of claim 1, wherein the at least one sensor is an ear lobe sensor.

14. The system of claim 1, wherein the at least one sensor is a digit sensor.

15. A method for breath training, comprising the steps of:
instructing a trainee through an output device based on a first breath training regimen, the first breath training regimen including a plurality of instructions, the plurality of instructions including instructing the trainee to hold their breath;
detecting physiological data from the trainee during the first breath training regimen through at least one sensor, the detected physiological data including a blood oxygen saturation level;
determining, by a data processor, an ending of at least one of the plurality of instructions of the first breath training regimen based on at least a rise in the blood oxygen saturation level prior to instructing the trainee to perform a subsequent one of the plurality of instructions;
analyzing the physiological data detected during the first breath training regimen by the data processor to determine when the trainees has resumed normal breathing using the detected blood oxygen saturation level and to determine compliance of the trainee with the first breath training regimen based on the physiological data detected after the instruction instructing the trainee to hold their breath and before the determination of when the trainee has resumed normal breathing, the data processor coupled to the output device and the at least one sensor; and providing feedback generated by the data processor to the trainee after the trainee completes the first breath training regimen that is based on the analysis of the physiological data received during the first breath training regimen, the feedback including an updated, second breath training regimen that is based on the determined compliance of the trainee with the first breath training regimen.

16. The method of claim 15, wherein the analyzing step is performed by an expert.

17. The method of claim 15, wherein the analyzing step further comprises comparatively analyzing the detected physiological data with gathered data from a plurality of trainees, and
wherein the second breath training regimen that is updated based on the comparative analysis of the physiological data of the trainee detected during the first breath training regimen to the physiological data gathered from the plurality of trainees.

18. The method of claim 15, further comprising the step of determining the identity of the trainee based on the physiological data.

19. The method of claim 15, further comprising the step of determining compliance of the trainee to the breath training regimen based on the physiological data.

20. An apparatus for breath training, the apparatus comprising:
an output device;
at least one sensor configured to detect physiological data from a trainee during a first breath training regimen, wherein the detected physiological data includes blood oxygen saturation level and a heartbeat of the trainee; and
a data processor coupled to the output device and the at least one sensor, the data processor configured to:
receive and analyze the detected physiological data,
determine an identity of the trainee based on the physiological data obtained from the trainee by performing a spectrum analysis of the heartbeat of the trainee to determine a power level and frequency of the heartbeat of the trainee and calculating a square root of the power level and frequency of the heartbeat of the trainee, and comparing the square root of the power level and frequency of the heartbeat of the trainee to a stored set of physiological data associated with the trainee,
provide instructions to the trainee through the output device as part of a first breath training regimen and the determined identity of the trainee, the instructions including instructing the trainee to hold their breath;
analyze the physiological data that was detected during the first breath training regimen to determine when the trainee has resumed normal breathing using the detected blood oxygen saturation level and to determine a compliance of the trainee with the first breath training regimen based on the physiological data detected after the instruction instructing the trainee to hold their breath and before the determination of when the trainee has resumed normal breathing, and
provide feedback to the trainee after the trainee completes the first breath training regimen that is based on the analysis of the physiological data received during the first breath training regimen, the feedback including a second breath training regimen that is based on the determined compliance of the trainee with the first breath training regimen.

21. The apparatus of claim 20, further comprising a memory storage device coupled to the data processor, the memory storage device configured to store the physiological data.

22. The apparatus of claim 20, wherein the at least one sensor comprises a blood oxygen saturation level sensor.

23. The apparatus of claim 20, wherein the determining an identity of the trainee further comprises:
  analyzing patterns of breathing to determine the identity of the trainee, the patterns of breathing including at least one of breathing frequency, expiratory and inspiratory durations, expiratory and inspiratory ratio, tidal volume, drive and timing components of breathing, flow profile, breath to breath variations, or frequency of augmented breathing behaviors.

24. The apparatus of claim 1, wherein the processor is further configured to:
  automatically detect over-breathing, count a number of over-breathing cycles, and instruct the trainee to repeat or stop the first training regimen if the number exceeds a pre-determined value.

25. The apparatus of claim 1, wherein the feedback and the second breath training regimen are both provided asynchronously to the first breath training regimen.

* * * * *